March 10, 1931.  C. E. McCOY  1,795,876
APPARATUS FOR SERVING MATERIAL UPON CORES
Filed May 24, 1928    2 Sheets-Sheet 1
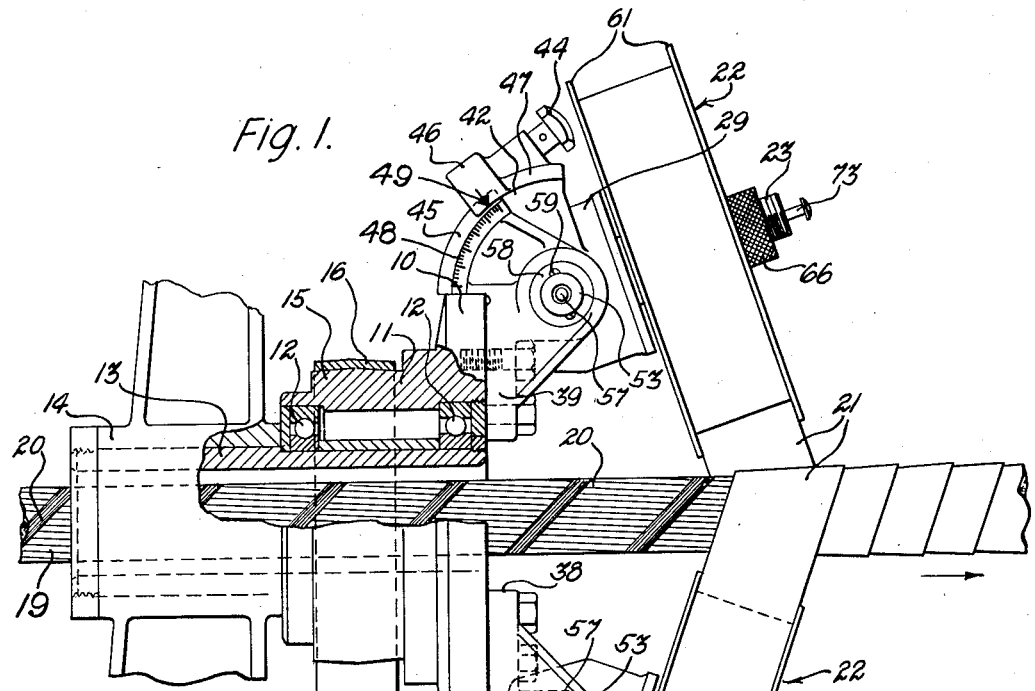
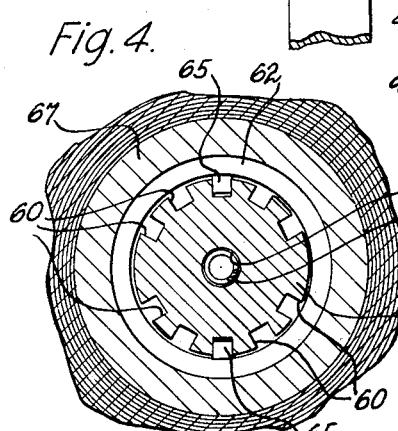
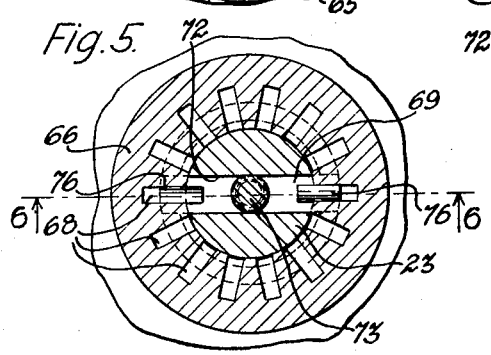
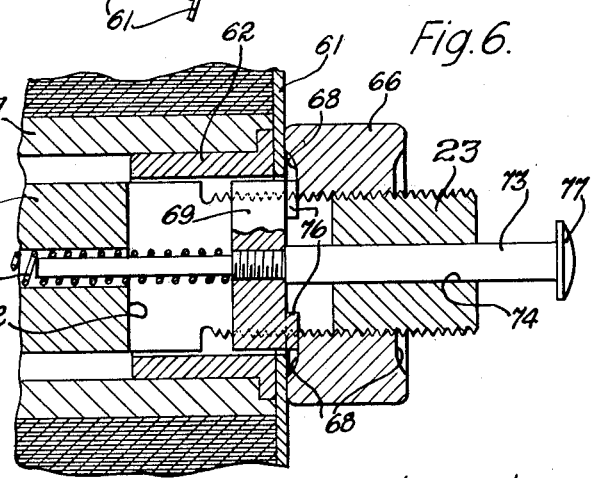
Inventor
Clarence E. McCoy
by *[signature]* Att'y.

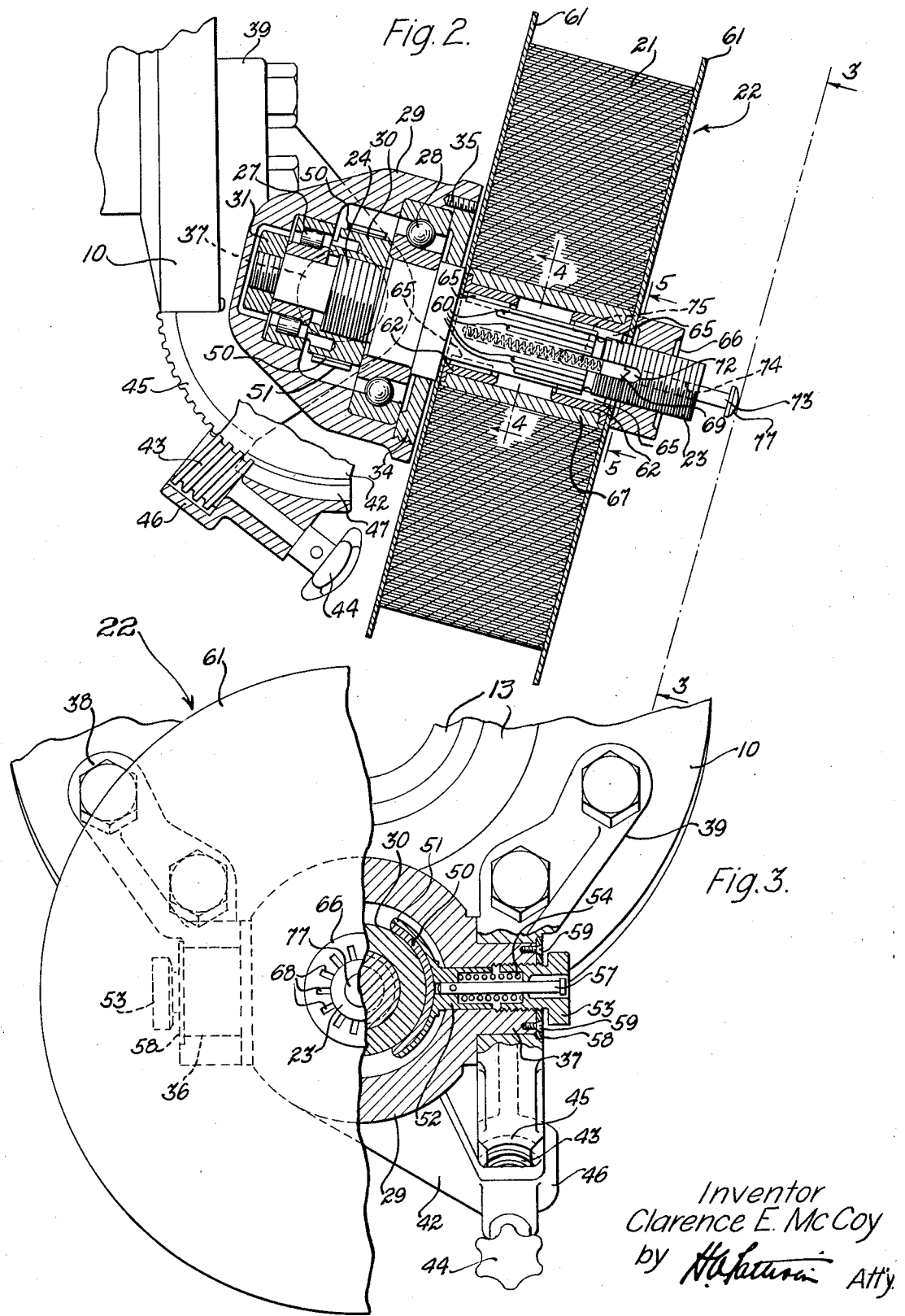

Patented Mar. 10, 1931

1,795,876

UNITED STATES PATENT OFFICE

CLARENCE EARL McCOY, OF OAK PARK, ILLINOIS, ASSIGNOR TO WESTERN ELECTRIC COMPANY, INCORPORATED, OF NEW YORK, N. Y., A CORPORATION OF NEW YORK

APPARATUS FOR SERVING MATERIAL UPON CORES

Application filed May 24, 1928. Serial No. 280,136.

This invention relates to apparatus for serving material upon a core, and more particularly to apparatus for applying a spiral wrapping of tape to a core.

The primary objects of this invention are to provide a simple and efficient apparatus for applying material of various widths spirally to a core and for varying the angle of application or pitch of the material to the core.

In accordance with one embodiment, this invention comprises a rotary axially apertured serving head provided with means for supporting a plurality of individually adjustable arbors upon one side thereof, each supporting a reel having a roll of tape mounted thereon which is to be applied spirally to a core, arranged axially of the serving head, the angularity of each arbor to the longitudinal axis of the serving head and the locking therof in an adjusted position are accomplished by a worm and worm gear segment mechanism. The peripheral surface of the arbor is provided with a plurality of keyways of different lengths which selectively cooperate with reel halves for accommodating rolls of tape of various widths.

Other objects and advantages of this invention will more fully appear from the accompanying detailed description taken in connection with the accompanying drawings, in which Fig. 1 is a side view, partly in section, of a material serving apparatus embodying the features of this invention shown applied to a stranding machine which is illustrated fragmentarily;

Fig. 2 is an enlarged fragmentary view, partly in section, of the lower portion of Fig. 1;

Fig. 3 is a fragmentary view, partly in section, looking toward the left on the plane of the line 3—3 of Fig. 2;

Figs. 4 and 5 are enlarged vertical sections on the lines 4—4 and 5—5, respectively, of Fig. 2, and Fig. 6 is a section on the line 6—6 of Fig. 5.

In the drawings the features of this invention have been shown applied to a serving head 10 of a stranding machine such as is used in the manufacture of telephone cables. The head 10 which is circular and provided with a sleeve portion 11 at one side is rotatably journaled by means of roller bearings 12—12 upon one end of a hollow stud shaft 13 fixed at its opposite end to a standard 14 which represents a portion of the frame of the stranding machine. The head 10 may be rotated at a predetermined rate of speed by means of a pulley 15 and a driving belt 16, the pulley being formed upon the sleeve portion 11. Through the opening provided in the stud shaft 13 there is advanced toward the right, as viewed in Fig. 1, at a predetermined rate by means such as a capstan, which is not shown, and during the operation of the stranding machine, a stranded telephone switchboard cable 19, which has been bound by a textile wrapping 20 served therearound in an open helical formation by a serving means which is not shown. A serving of tape 21 is applied spirally with an overlapping lay on the cable 20 during its advance, either from a single pad or a plurality of them. In Fig. 1 two supplies of tape 21 are shown mounted upon the head 10 at diametrically opposite points. The tape 21 may be composed of paper or fabric and in some instances may be metal, such as lead foil, depending upon the type of telephone cable being manufactured.

The stranding machine being of a well known type and since it forms no part of this invention, it is thought that a detailed description and disclosure thereof is unnecessary.

Since the correct angle of application or lead at which the tape is to be served to the longitudinally moving cable is governed by the width of the tape, the diameter of the cable and the rate of advance thereof it is desirable to provide means for readily and accurately varying the angle of the arbors supporting the tape supplies with respect to the longitudinal axis of the cable and thereafter locking them in their adjusted position. As illustrated in the drawings the pads of tape 21 are mounted upon holders or reels 22 keyed to rotatably and angularly adjustable arbors 23. Referring to Figs. 2 and 3, wherein is illustrated in detail the lower arbor 23 of Fig. 1 and the means for adjusting it angularly upon the head 10, it being understood that the upper arbor is identical, the arbor 23 comprises a shouldered portion 24 at its inner end supported in bearings 27 and 28, respectively, mounted in a housing 29. Threaded onto a shoulder of the arbor 23 intermediate the bearings 27 and 28 is a brake drum 30 which will be referred to hereinafter. The drum 30 and a nut 31 threaded onto the inner end of the arbor 23 serve to retain the bearings 27 and 28 upon the inner end of the arbor, the whole assembly being maintained in position in the housing 29 by a retainer ring 34 threaded into the open right end thereof (Fig. 2), the ring fitting closely the greatest diameter of the arbor and flush with the right end surface of the housing. A lock screw 35 is threaded into the housing 29 and the ring 34 between the inner and outer peripheral surfaces thereof, respectively, for the purpose of preventing an unthreading of the ring from the housing during the rotation of the arbor 23. The housing 29 at directly opposite points (Fig. 3) is provided with projecting annular lugs 36 and 37 journaled in brackets 38 and 39, respectively, secured to the right face of the head 10.

Journaled in an offset arm 42 extending from the housing 29 is a worm 43 to the shaft of which is fixed a handle 44 for the purpose of manually rotating the worm. Meshing with the worm 43 is a worm gear segment 45 formed integral with the bracket 39. The arm 42 is provided with a housing portion 46 serving to surround the worm 43 and forming a guard portion 47 for the teeth of the segment as the worm advances therealong when the handle 44 is rotated to change the angular position of the arbor 23 relative to the longitudinal axis of the cable 20, which will be described more fully hereinafter.

To facilitate the adjustment of the arbors 23 so that the tape 21 will be directed to the cable 20 at a predetermined angle, particularly when two tapes are being served, since each tape is served at the same angle to the longitudinal axis of the cable, a series of graduations 48 (Fig. 1) is marked on the side face of each of the stationary worm gear segments 45 and extending for a suitable distance, a movable index mark 49 being provided on the corresponding sides of the arms 42 for cooperating with the graduations 48. Only one set of graduations 48 and index mark 49 appear upon the upper reel supporting and adjusting mechanism in Fig. 1, since the other set is on the opposite side of the lower mechanism. It will be apparent that with the sets of graduations 48 and marks 49 the tapes 21 from each of the reels 22 may be easily adjusted to a predetermined similar angle for application to the cable 20.

Constantly bearing against the periphery of the brake drum 30 at diametrically opposite points is a pair of brake shoes 50, one of the shoes being illustrated in Fig. 3 for the purpose of maintaining tension on the tape 21 during the serving thereof to the cable 20 and when the serving head 10 ceases rotating to instantly bring the reel 22 to a stop and thus prevent the tape from uncoiling. The brake shoe 50 is provided with a braking surface which may comprise a layer of cork 51. An apertured internally shouldered bearing portion 52 of the shoe 50 is fitted to slide in an aperture provided in the lug 37 of the housing 29 and threaded into the outer end of the aperture of the lug is a screw 53 for adjusting the tension of a spring 54 bearing at opposite ends against the internal shoulder of the shoe 50 and a similar shoulder provided along an aperture formed in the screw 53. Pinned to the shoe 50 within the aperture and adjacent the inner end thereof is a safety stud 57 provided with a head at its outer end which is larger in diameter than the smallest diameter of the aperture formed in the screw 53. The purpose of the stud 57 is to prevent the screw 53 from being projected from the rotating head 10 with the likelihood of inflicting injury to an operator in case it should unthread from its aperture during the serving operation. A pair of washers 58, slightly greater in diameter than the end faces of the lugs 36 and 37, and extending into circular depressions formed in the outer adjacent faces of the brackets 38 and 39 are secured by screws 59 to the end faces of the lugs and serve to hold the housing 29 and the brackets 38 and 39 together as one assembly when the same is removed from the head 10. The width of the tape 21 to be served to the cable 20 will depend on the diameter of the cable, the greater the diameter of the cable the wider the tape and vice versa.

To provide for the mounting of tape pads of various widths on the head 10 the arbor 23 (Figs. 2 and 4) adjacent its outer end is formed with two similar and diametrically opposed series of keyways 60 in its peripheral surface, all the keyways of which are of the same depth and width but of various graduated lengths in each series, so that in the arbor two keyways (one in each series) of each length are arranged at diametrically opposite points of the arbor. The reel 22 comprises two similar halves, each having an annular head 61 and an attached axial annular bushing 62 provided with a pair of diametrically oppositely arranged keys 65 fixed to the inner peripheral surface thereof, the keys being arranged to freely slide in the keyways 60. In Fig. 2 the reel halves are disposed upon the arbor 23 to carry a maximum width of tape 21 therebetween, since the keys 65 of the inner half of the reel are mounted in the keyways 60 of greatest length.

To adjust the reel 22 for a narrower pad of tape 21 than that shown in Fig. 2, the outer half of the reel is removed from the arbor 23 after the removal of a reel locking nut 66, to be presently described, and thereafter the inner half of the reel is removed from the arbor and then rotated to align the keys 65 thereof with that pair of the keyways 60 of the arbor, which will provide a reel 22 of the desired width; the reel half is then mounted on the arbor with the keys thereof at the inner end of the selected keyways. The pad of tape 21 which is coiled on an apertured core 67 is then mounted on the bushing 62 of the reel half and thereafter the outer reel half is mounted on the arbor with the bushing thereof inserted in the core 67 of the pad 21, the keys 65 being aligned with the same pair of keyways cooperating with the keys of the inner reel half as shown in Fig. 2 or with any other set of keyways.

The extreme outer end of the arbor 23 is threaded for the reception of the nut 66, hereinbefore referred to, which upon opposite end faces is provided with a plurality of closely spaced radial depressions 68 (Figs. 5 and 6) extending from the periphery of the threaded aperture of the nut to a point adjacent the outer periphery thereof. A key 69 extends laterally through a slot 72 provided in the arbor 23 and is adapted to be moved along the slot by a pin 73 reciprocably carried in an aperture 74 of the arbor and arranged coaxially with the arbor and the nut 66, the pin being fixed to the key. A compression spring 75 is mounted in the aperture 74 between the inner end wall thereof and the left face of the key 69 for the purpose of normally pressing the outer right face thereof against the inner face of the nut 66, a pair of projecting ratchet type teeth 76 being arranged upon the right face of the key for engaging in a pair of the oppositely disposed depressions 68 of the nut. The pin 73 is provided at its outer end with a head 77 for facilitating the release of the key 69 from the nut 66. It will be apparent that upon pressing the pin 73 inwardly against the tension of the spring 75 the teeth 76 of the key 69 may be withdrawn from the depressions 68 of the nut 66 and upon maintaining the teeth in their disengaged position the nut 66 is free to be unthreaded from the arbor 23.

When locking the reel 22 to the arbor the nut 66 is threaded onto the arbor until the pad of tape 21 is firmly clamped longitudinally upon the arbor, the ratchet teeth 76 riding in and out of the depressions 68 of the nut in a well known manner. The tension of the spring 75 serves to prevent the nut 66 from turning on the arbor until the pin 73 is again pressed inwardly. The depressions 68 are provided upon opposite end faces of the nut 66 for the purpose of expediting the locking of the reel 22 to the arbor 23, since it is not necessary to select a particular inner end face of the nut when threading it onto the arbor.

In adjusting and adapting the serving apparatus hereinbefore described to the serving of a particular diameter of cable with tapes 21, the width of the tapes used being selected in accordance with the diameter of the cable, the first step is to mount and lock the supplies of selected tapes upon the variable width reels 22 in the manner fully described hereinbefore. Each of the arbors 23 is then angularly adjusted by rotating the associated handle 44 which causes a movement of the worm 43 fixed to the handle along the worm gear segment 45, the tape supply pivoting upon the brackets 38 and 39. The handle 44 is rotated until the predetermined angle at which the tapes are to be served to the cable, which is governed by the width of the tape, the diameter of the cable and the rate at which the cable is to be advanced during the serving operation as hereinbefore mentioned, is indicated by the cooperating graduations 48 and index mark 49. Due to the use of a worm and worm gear segment for adjusting the angularity of the arbor no auxiliary locking means is needed for maintaining the adjusted position of the arbor, the cooperating surfaces of the worm and worm gear segment serving this purpose.

Although the invention has been disclosed and described as applied to an apparatus for serving a particular object, it is clear that it may have a more general application and that modifications can be made without departing from the spirit and scope of the appended claims.

What is claimed is:

1. In a core serving apparatus, a rotary element having an axial aperture for the passage of a longitudinally moving core, an arbor carrying a supply of tape to be spirally applied to the core, means for rotatably supporting the arbor upon the element, said means including a housing for one end of the arbor pivotally attached to the element, a brake drum on the arbor within the housing, a brake shoe carried by the housing for engagement with the brake drum, resilient means acting directly against the brake shoe at its point of engagement, and means for moving the housing about its pivot for varying the angularity of the arbor relative to the longitudinal axis of the element comprising a rotary element journaled on the housing and cooperatively engaged with a surface upon the element.

2. In a core serving apparatus, an arbor, a variable width reel holding a supply of material supported thereon, means for revolving the arbor around a moving core for applying the material spirally thereto, and means for supporting and maintaining the arbor on the revolving means at varying angles relative to the longitudinal axis thereof, the arbor and the reel provided with cooperating outer and inner longitudinally extending peripheral portions, respectively, for predeterminedly varying the width of the reel.

3. In a core serving apparatus, an arbor, a variable width reel holding a supply of tape supported thereon, and means for revolving the arbor around a longitudinally moving core for applying the tape spirally thereto, the arbor and the reel provided with cooperating outer and inner longitudinally extending peripheral portions, respectively, for predeterminedly varying the width of the reel.

4. In a core serving apparatus, an arbor, a variable width reel holding a supply of tape supported thereon, and means for revolving the arbor around a longitudinally moving core for applying the tape spirally thereto, the arbor provided upon its periphery with a plurality of keyways of different lengths for selective cooperation with inner peripheral portions of the reel for predeterminedly varying the width of the reel.

5. In a core serving apparatus, an arbor, a variable width reel holding a supply of material thereon, and means for revolving the arbor around a moving core for applying the material spirally thereto, the arbor provided upon its periphery with a plurality of series of keyways, the keyways within each series having a different dimension for selective cooperation with inner peripheral portions of the reel for predeterminedly varying the width of the reel.

6. In a core serving apparatus, an arbor, a reel comprising adjustable sections supported on the arbor and holding a supply of material, and means for revolving the arbor around a moving core for applying the material spirally thereto, the arbor and the reel provided with cooperating outer and inner peripheral portions, respectively, for predeterminedly varying the width of the reel and preventing relative rotary movement between the arbor and the reel sections.

7. In a core serving apparatus, an arbor, a reel comprising adjustable sections supported on the arbor and holding a supply of material, and means for revolving the arbor around a moving core for applying the material spirally thereto, the arbor and the reel provided with a plurality of keyways arranged in oppositely disposed series, the keyways within each series having a different dimension for selective cooperation with inner peripheral keys provided on the reel sections for predeterminedly varying the width of the reel.

8. In a core serving apparatus, an arbor, a variable width reel holding a supply of tape supported thereon, means for revolving the arbor around a longitudinally moving core for applying tape spirally thereto, the arbor provided upon its periphery with a plurality of keyways of different lengths for selective cooperation with inner peripheral portions of the reel for predeterminedly varying the width of the reel, and braking means operative upon the arbor for controlling the tension in the applied tape.

In witness whereof, I hereunto subscribe my name this 11th day of May, A. D. 1928.

CLARENCE EARL McCOY.